(No Model.) 2 Sheets—Sheet 1.
J. W. MORGAN.
OIL CUP.
No. 477,379. Patented June 21, 1892.
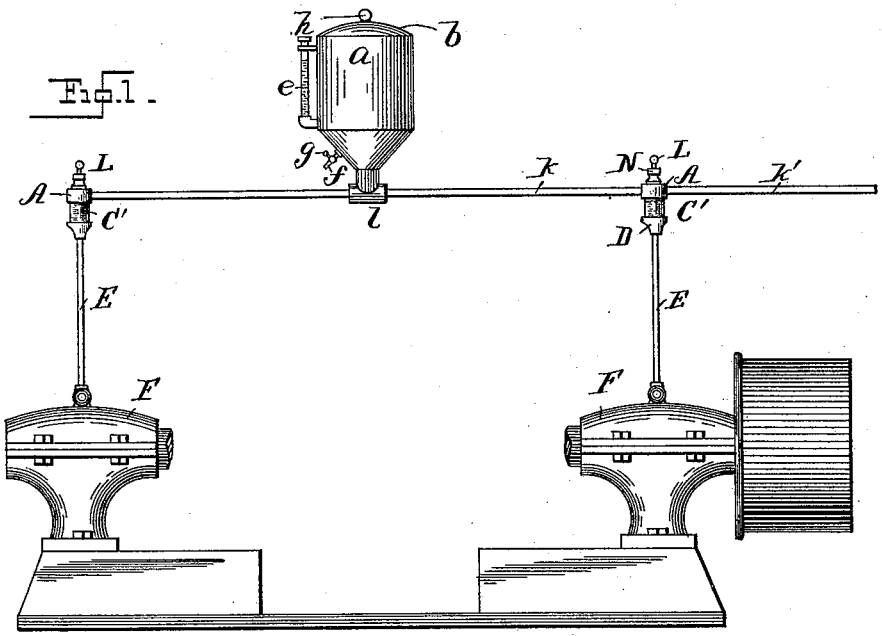
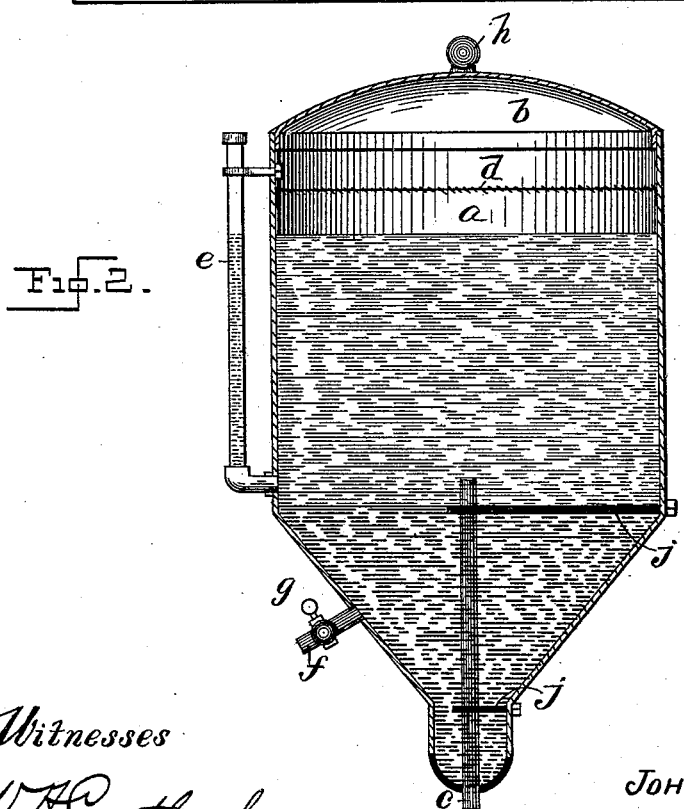
Witnesses
W. H. Courtland
Nellie L. Pope.
Inventor
JOHN W MORGAN
BY HIS ATTORNEY
Edward P. Thompson
THE NORRIS PETERS CO., PHOTO-LITHO., WASHINGTON, D. C.

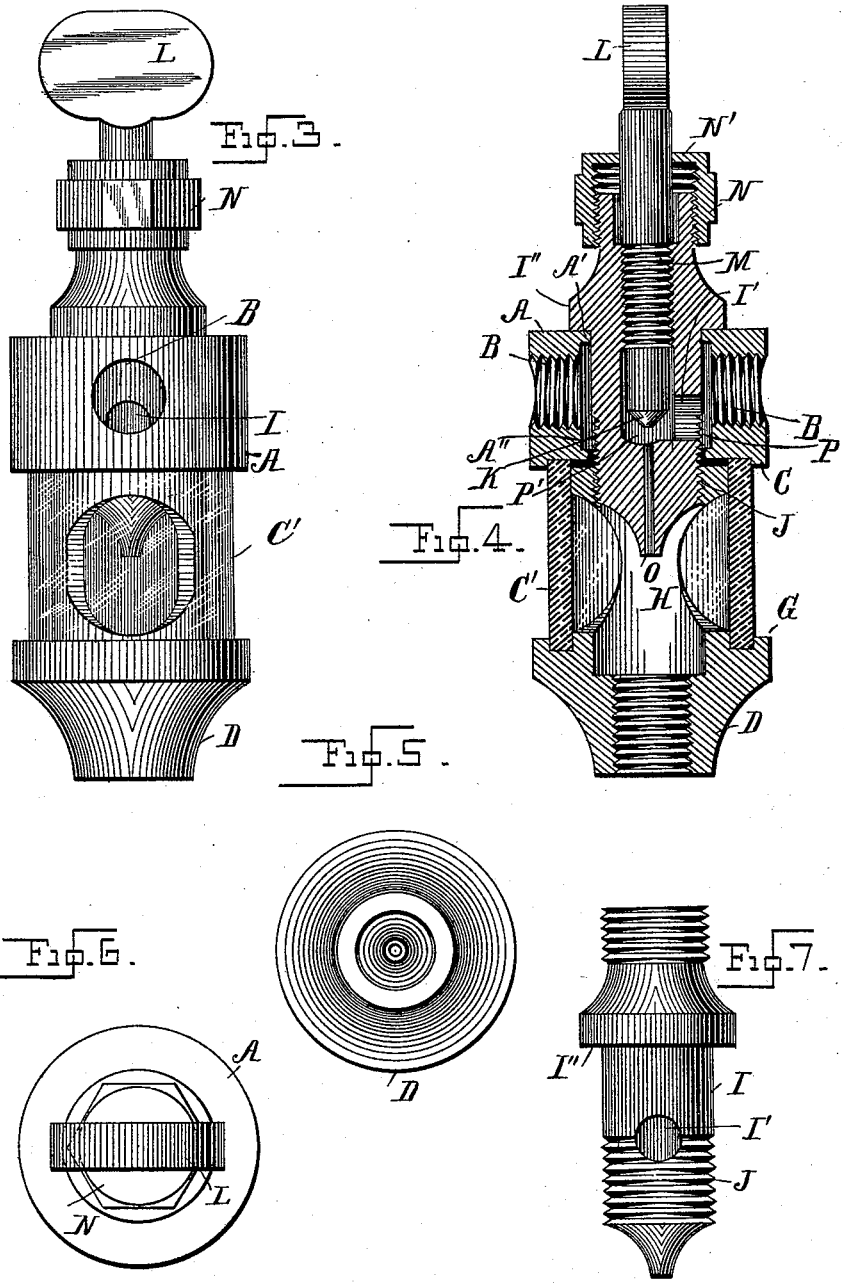

UNITED STATES PATENT OFFICE.

JOHN W. MORGAN, OF BELLEVILLE, ILLINOIS.

OIL-CUP.

SPECIFICATION forming part of Letters Patent No. 477,379, dated June 21, 1892.

Application filed February 1, 1892. Serial No. 419,872. (No model.)

*To all whom it may concern:*

Be it known that I, JOHN W. MORGAN, a citizen of the United States, and a resident of Belleville, in the county of St. Clair and State of Illinois, have invented certain new and useful Improvements in Oil-Cups, of which the following is a specification.

My invention relates to apparatus for oiling the bearings of a machine, such as those of a dynamo, steam-engine, or similar machine.

The object of the invention is to provide greater efficiency and usefulness of the ordinary oiling process.

The invention is best explained in all its details by reference to the accompanying drawings, in which—

Figure 1 is a view in elevation of the complete system applied to the bearings of the shaft of a dynamo, in which the elements of the dynamo are mostly omitted. Fig. 2 is a vertical section of the oil-tank, which is shown in elevation in Fig. 1, near the top of the sheet. Fig. 3 is an elevation of the oil-cup proper, and which is visible on a very small scale in Fig. 1 in duplicate. Fig. 4 is a vertical section of the device seen in Fig. 3. The section is in a plane perpendicular to the sheet. Fig. 5 is an end view, and Fig. 6 is a view of the opposite end, while Fig. 7 shows in elevation the inner element of the oil-cup, being the valve-carrier.

The oil tank or feeder seen in Fig. 2 consists of the combination of a vessel $a$, having a cover $b$ and tapering at the lower end where it terminates in a tube $c$, that extends upward into the vessel to or above the level at which the tapering begins, a netting $d$, stretched across the upper portion of said vessel, a gage $e$ outside of the vessel and connected at its upper and lower point with the inside of the vessel, an outlet-pipe $f$, provided with a stop-cock $g$, and other details—namely, the handle $h$ by which the cover may be removed, and the rod $i$ by which the gage is held at its upper end in an upright position. Rods $j$ hold the tube $c$ in its proper position.

The tank for the oil is carried upon a tube $k$, having an enlargement $l$ at its central part, in which the tube $c$ terminates, so that the oil may be fed from the central portion of the tank or vessel $a$ into the tube $k$.

The oil-cup consists of the combination of a ring A, having as many holes radiating from the center as there are bearings to be fed from it as a center, the holes being lettered B, an annular shoulder C on the lower side of the said ring, in which fits a glass cylinder C', forming the sides of a sight-feed, a nozzle D, screwed upon the pipe E, which leads to the bearing F, the said nozzle carrying a second shoulder G, within which fits the lower end of the said glass cylinder, a perforated cylindrical projection H upon said nozzle and fastened to the valve-holder I, which has a screw J for the purpose, and a valve K, having a handle L and screw M, which screws into the upper end of the valve-holder I and through a nut N, which screws externally upon the upper end of the said valve-holder.

Longitudinally through the valve-holder is a hole O, extending into the interior and located in the path of the valve K, so that it may be closed when the valve is screwed downward. When the oil runs through this hole O, it may be seen through the glass cylinder C'. It may be allowed to run though drop by drop or in a steady large or small stream. The nut N has an inwardly-projecting shoulder N', which forms a bearing and guide for the upper shank of the valve. The ring A has an inwardly-projecting shoulder A' at the top and A'' at the bottom, whereby a chamber is formed around the valve-holder I, which, being provided with a hole I', allows the oil to pass from said chamber to the said valve-holder and into the same and through the hole O whenever the valve is open. The oil in the first place enters into the chamber, which is lettered P, by the holes B in the side of the ring A, or at least the oil coming from one pipe—say, K—enters into the chamber P; but if there is another pipe, as K', extending from the ring A some of the oil may pass therein and go to lubricate other bearings at a distant point. It is shown that the ring A has four holes, one on each side; but it is evident that the number may be reduced or increased. In Fig. 1 at the left only one is necessary. In Fig. 1 at the right two are used, while in Fig. 4 two are shown, and another being supposed to exist on the opposite side.

In the beginning of the operation the operator pours oil into the vessel $a$, whereby any dirt is strained by passing through the sieve d. By reason of greater specific gravity any water in the oil settles to the funnel-shaped portion of the vessel, where it may be drawn off through the tube f. The gage e indicates how high the oil stands in the vessel a. The oil can run out of the tube c and into the chamber P, and thence into the valve-chamber P', whence it can go to the bearing through the tube E, whenever the valve K is opened. Some of the oil may pass on through the tube k to other oil-cups and bearings. It should be noticed that the ring A is so arranged that it can rotate independently of loosening any screws. This feature has an important function.

The oil-cup is first screwed upon any bearing, and then the ring A can be rotated until the hole b comes in position for the pipe k. In order to be able to turn the ring the valve-holder I is turned, so as to loosen its shoulder I'' from pressing upon and holding the ring. When the latter is adjusted to the required position, the shoulder is caused to come again against the ring and the said ring is thereby held in a fixed position. Therefore the ring is adjustable to any position.

By the system hereinbefore described any number of bearings on any number of machines may be oiled without the necessity of a man carrying around an oil-can.

I claim as my invention—

1. An oil-cup consisting of the combination of a valve-holder provided with a chamber in the interior thereof and with a passage I' in the side thereof, a valve passing through the top thereof and through a nut which screws upon said valve-holder and surrounds the valve-shank, a ring having upper and lower inwardly-projecting flanges A' and A'', which fit around the said valve-holder to form a chamber P, communicating through the passage mentioned with the inner chamber P', and provided with passage-ways B, opening to the feed-pipes k, a delivering-pipe E, a nozzle D, secured to said pipe E and to the lower portion of the valve-holder centrally, and a shoulder G on the said nozzle, and a shoulder C on the said ring, between which shoulders is a glass cylinder C', the valve-holder having a longitudinal hole O in the path of the said valve opening into the said chamber P'.

2. In combination with an oil-cup, an adjustable ring thereon and provided with radial holes, a valve-holder located centrally in said ring and having a valve-chamber communicating with said holes and with the bearing of the machine to be oiled, and a valve controlling the passage-way from the said chamber to the said bearing.

3. An oiling system consisting of the combination of a vessel a containing oil, an oil-cup equipped upon each of independent bearings of one or more machines, feed-pipes connecting the said vessel with said cups, delivery-pipes connecting said cups with said bearings, and an adjustable ring on each oil-cup and provided with holes in which fit said feed-pipes and which communicate with the said delivery-pipes through a valve-opening, which is provided with a valve.

In testimony that I claim the foregoing as my invention I have signed my name, in presence of two witnesses, this 26th day of January, 1892.

JOHN W. MORGAN.

Witnesses:
   DAVIS FREEMAN,
   H. E. WILSON.